United States Patent
De Silva et al.

[19]

[11] Patent Number: 6,131,782
[45] Date of Patent: Oct. 17, 2000

[54] ARTICLE CARRIER FOR A VEHICLE

[75] Inventors: Amesh De Silva, Richmond Hill, Canada; Dennis D. Noonan, Royal Oak, Mich.; Daniel S. Baylis, Fowlerville, Mich.; Robert D. Worley, Fenton, Mich.

[73] Assignee: Decoma International Inc., Ontario, Canada

[21] Appl. No.: 09/231,786

[22] Filed: Jan. 15, 1999

Related U.S. Application Data

[60] Provisional application No. 60/071,521, Jan. 15, 1998.

[51] Int. Cl.[7] ........................................................ B60R 9/00
[52] U.S. Cl. ........................... 224/321; 224/315; 224/322; 224/324; 224/325
[58] Field of Search ..................................... 224/321, 322, 224/324, 325, 326, 329, 330, 331, 309, 315

[56] References Cited

U.S. PATENT DOCUMENTS

| | | |
|---|---|---|
| 4,588,117 | 5/1986 | Bott . |
| 4,768,691 | 9/1988 | Stapleton . |
| 4,811,877 | 3/1989 | Heideman . |
| 4,911,348 | 3/1990 | Rasor et al. . |
| 5,190,198 | 3/1993 | Cucheran ................................ 224/321 |
| 5,456,512 | 10/1995 | Gibbs et al. . |
| 5,715,980 | 2/1998 | Blankenburg et al. . |
| 5,924,614 | 7/1999 | Kuntze et al. ............................ 224/321 |

FOREIGN PATENT DOCUMENTS

WO 94/10007   5/1994   WIPO ................................... 224/321

*Primary Examiner*—Gregory M. Vidovich
*Assistant Examiner*—Maerena Brevard
*Attorney, Agent, or Firm*—Pillsbury Madison & Sutro LLP

[57] ABSTRACT

The present invention relates to an article carrier assembly which incorporates a relatively simple mechanism for locking and unlocking the cross rail assembly from one side of the vehicle. One aspect of the present invention relates to an article carrier assembly having a manually turnable knob and a pair of linking members each connecting the knob with associated locking structure. Another aspect of the present invention relates to an article carrier assembly which has locking structures and rail supporting structures on opposing ends thereof. An actuator is movable between a locked position wherein the locking structures are in locked positions and the supporting structures are in extended positions, an adjusting position wherein the locking structures are in the unlocked positions thereof and the supporting structures are in the extended positions thereof, and a release position wherein the locking structures are in the unlocked positions thereof, thereby allowing the cross rail assembly to be moved generally upwardly out of its operative position. Yet another aspect of the present invention relates to an article carrier having a manually turnable drum which can be turned to move locking members between locked and unlocked positions.

28 Claims, 6 Drawing Sheets

ARTICLE CARRIER FOR A VEHICLE

The present application claims priority from U.S. Provisional Patent Appln. Serial No. 60/071,521, filed Jan. 15, 1998, the entirety of which is incorporated into the present application by reference.

FIELD OF INVENTION

This invention relates to an article carrier for a vehicle. In particular, this invention relates to an article carrier which can be adjusted longitudinally relative to the vehicle and also removed from the vehicle by a single operator from one side of the vehicle.

BACKGROUND OF INVENTION

Article carriers for motor vehicles are well known in the art. Typically, an article carrier will have a cross rail assembly with opposite ends engaging longitudinal side rails mounted on the vehicle. Each end will have a locking or clamping mechanism to lock the cross member in place and to secure the load placed thereon.

Several prior art article carriers, such as the ones disclosed in U.S. Pat. Nos. 5,190,198 and 4,294,388, are able to be disengaged from one side of the vehicle.

However, the mechanisms for ganging the locking or clamping mechanism on one side to the other side are complicated and thus difficult and expensive to manufacture. As a result, article carriers in which the cross rail assembly can be adjusted longitudinally from one side of the vehicle have not yet seen significant commercial success.

SUMMARY OF THE INVENTION

It is therefore an object of the present invention to provide an article carrier for a vehicle having a relatively simple mechanism for locking and unlocking the cross rail assembly in place from one side of the vehicle. To meet this object, the present invention provides an article carrier assembly for installation on a generally upwardly facing exterior surface of a motor vehicle. The article carrier assembly comprises a pair of elongated side rails to be mounted on the exterior surface of the motor vehicle in spaced apart and generally parallel relation to one another. An elongated cross rail assembly is to be mounted transversely with respect to the side rails in an operative position. The cross rail assembly has a locking assembly comprising a pair of locking structures, each of the locking structures being disposed at opposing end portions of the cross rail assembly.

The locking structures are movable between (1) unlocked positions wherein the locking structures are disengaged from the side rails to allow for longitudinal movement of the cross rail assembly along the side rails through a range of operating positions and (2) locked positions wherein the locking structures are engaged with the side rails to releasably lock the cross rail assembly in a selected one of the range of operating positions. The locking assembly further comprises a manually actuable knob accessible from one side of the vehicle when the cross rail assembly is mounted transversely with respect to the side rails, and a pair of linking members each operatively connecting the knob with an associated one of the locking structures. The knob is manually turnable in (1) a locking direction to cause the linking members to push the locking structures into the locked positions thereof and (2) in an unlocking direction to cause the locking structures to be moved to the unlocked positions thereof, thereby allowing longitudinal movement of the cross rail assembly along the side rails through the range of operating positions.

Another aspect of the present invention provides an article carrier assembly for installation on a generally upwardly facing exterior surface of a motor vehicle. The article carrier assembly comprises a pair of elongated side rails to be mounted on the exterior surface of the motor vehicle in spaced apart and generally parallel relation to one another. An elongated cross rail assembly is to be mounted transversely with respect to the side rails in an operating position. Each of the side rails has a longitudinally extending recessed groove positioned and configured such that the grooves face generally inwardly towards one another when the side rails are mounted on the motor vehicle exterior surface.

The cross rail assembly has a locking assembly comprising a pair of locking structures and a pair of rail supporting structures, each of the locking structures and the supporting structures being disposed at opposing end portions of the cross rail assembly. The locking structures are movable between (1) unlocked positions wherein the locking structures are disengaged from the side rails to allow for movement of the cross rail assembly along the side rails through a range of operating positions and (2) locked positions wherein the locking members are engaged with the side rails to releasably lock the cross rail assembly in a selected one of the range of operating positions. The supporting structures are movable between (1) extended positions wherein the supporting structures are received within the grooves to prevent the cross rail assembly from being moved generally upwardly out of the operating position thereof and (2) retracted positions wherein the supporting structures are withdrawn from the grooves to allow the cross rail assembly to be moved generally upwardly out of the operative position thereof and removed from the side rails.

The cross rail assembly further comprises a manually operable actuator accessible from one side of the vehicle when the cross rail assembly is mounted transversely with respect to the side rails in the operating position thereof. The actuator is movable between (1) a locked position wherein the locking structures are in the locked positions thereof and the supporting structures are in the extended positions thereof, (2) an adjusting position wherein the locking structures to are in the unlocked positions thereof and the supporting structures are in the extended positions thereof, and (3) a release position wherein the locking structures are in the unlocked positions thereof and the supporting structures are in the retracted positions thereof, thereby allowing movement of the cross rail assembly generally upwardly out of the operative position thereof and removal of the cross rail assembly from the side rails.

Yet another aspect of the present invention provides an article carrier assembly for installation on a generally upwardly facing exterior surface of a motor vehicle. The article carrier assembly comprises a pair of generally elongated side rails to be mounted on the exterior surface of the vehicle in generally parallel and spaced apart relation to one another. An elongated cross rail assembly is to be mounted transversely with respect to the side rails in an operative position. The cross rail assembly has a locking assembly comprising a pair of locking structures, each of the locking structures being disposed at opposing end portions of the cross rail assembly. The locking structures are movable between (1) unlocked positions wherein the locking structures are disengaged from the side rails to allow longitudinal movement of the cross rail assembly along the side rails through a range of operating positions and (2) locked positions wherein the locking structures are engaged with the side rails to releasably lock the cross rail assembly in a selected one of the range of operating positions. The locking assembly comprises a turnable generally cylindrical drum and a pair of linking members operatively connected between the drum and the locking structures. The drum is accessible from one side of the vehicle when the cross rail assembly is in the operative position thereof. The drum is turnable in (1) a locking direction to push the linking members generally away from one another so as to move the locking members into the locked positions thereof and (2) an unlocking direction to pull the linking members generally toward one another so as to move the locking members to the unlocked positions thereof, thereby allowing movement of the cross rail assembly longitudinally along the side rails through the range of operating positions.

Other objects, features, and advantages of the present invention will become apparent from the following detailed description, the accompanying drawings, and the appended claims.

DESCRIPTION OF THE DRAWINGS

In drawings which illustrate embodiments of the invention.

DESCRIPTION OF THE INVENTION

Figure 1:
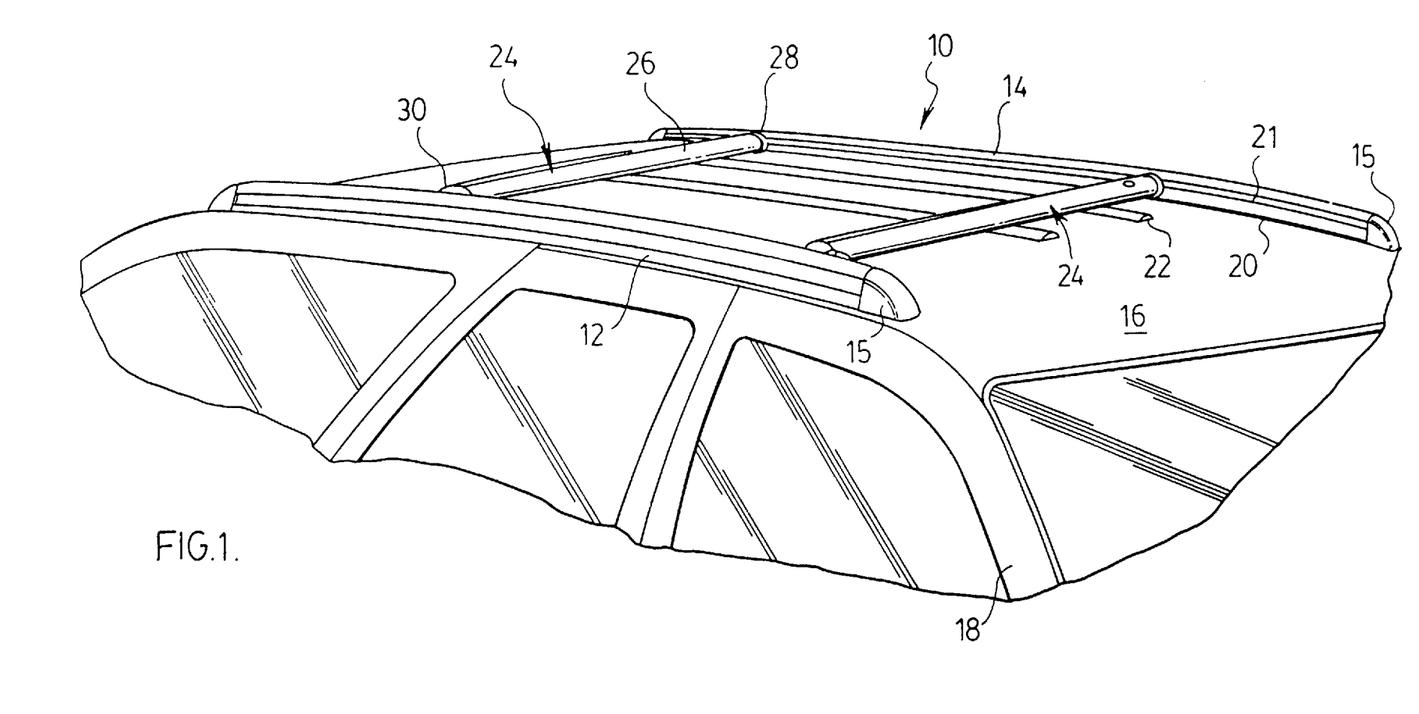
FIG. 1 is a perspective view of vehicle incorporating the article carrier of the present invention.

FIG. 1 shows an article carrier assembly, generally indicated at 10, constructed in accordance with the principles of the present invention. The article carrier 10 includes a pair of side rails 12 and 14 mounted in fixed, spaced relation on an exterior body surface 16 of a vehicle 18. Side rails 12 and 14 extend generally parallel to one another longitudinally with respect to the vehicle 16. In the illustrated embodiment, the article carrier assembly 10 is disposed on the roof panel of the vehicle 18. It can be appreciated that the article carrier 10 can be mounted on the outer surface of the trunk of the vehicle 18 or to the side rails of a pick-up truck.

The side rails 12 and 14 each have a hollow cross section which is opposite to each other. Preferably, the side rails 12 and 14 are roll formed. However it can be appreciated that other methods of construction, such as extrusion and gas assist injection molding may also be used. Each side rail 12 and 14 has an end plug 15 at each end thereof and each side rail has an elongated groove 21 extending substantially the length of the inner side wall 20.

The side rails 12 and 14 may be formed of any suitable material for supporting a load, such as metal, plastic and combinations thereof. Side rails 12 and 14 are adhered or affixed to the body surface 16 in any suitable manner well known in the art.

Protective slats 22 are disposed on the exterior body surface 16 of the vehicle between side rails 12 and 14. The slats 22 are fixed to the exterior body surface 16 in a manner similar to that of the side rails 12 and 14. Cargo may be placed on the slats 22 and secured to the cross rail assembly 24 with the slats 22 protecting the body surface 16.

The article carrier assembly 10 includes at least one cross rail assembly 24 mounted transversely with respect to the side rails 12 and 14 in an operative position. In the preferred embodiment, two such assemblies 24 are provided in a spaced relation; however any number of cross rail assemblies 24 may be provided in addition to a fixed or stationary cross rail.

Figure 2:
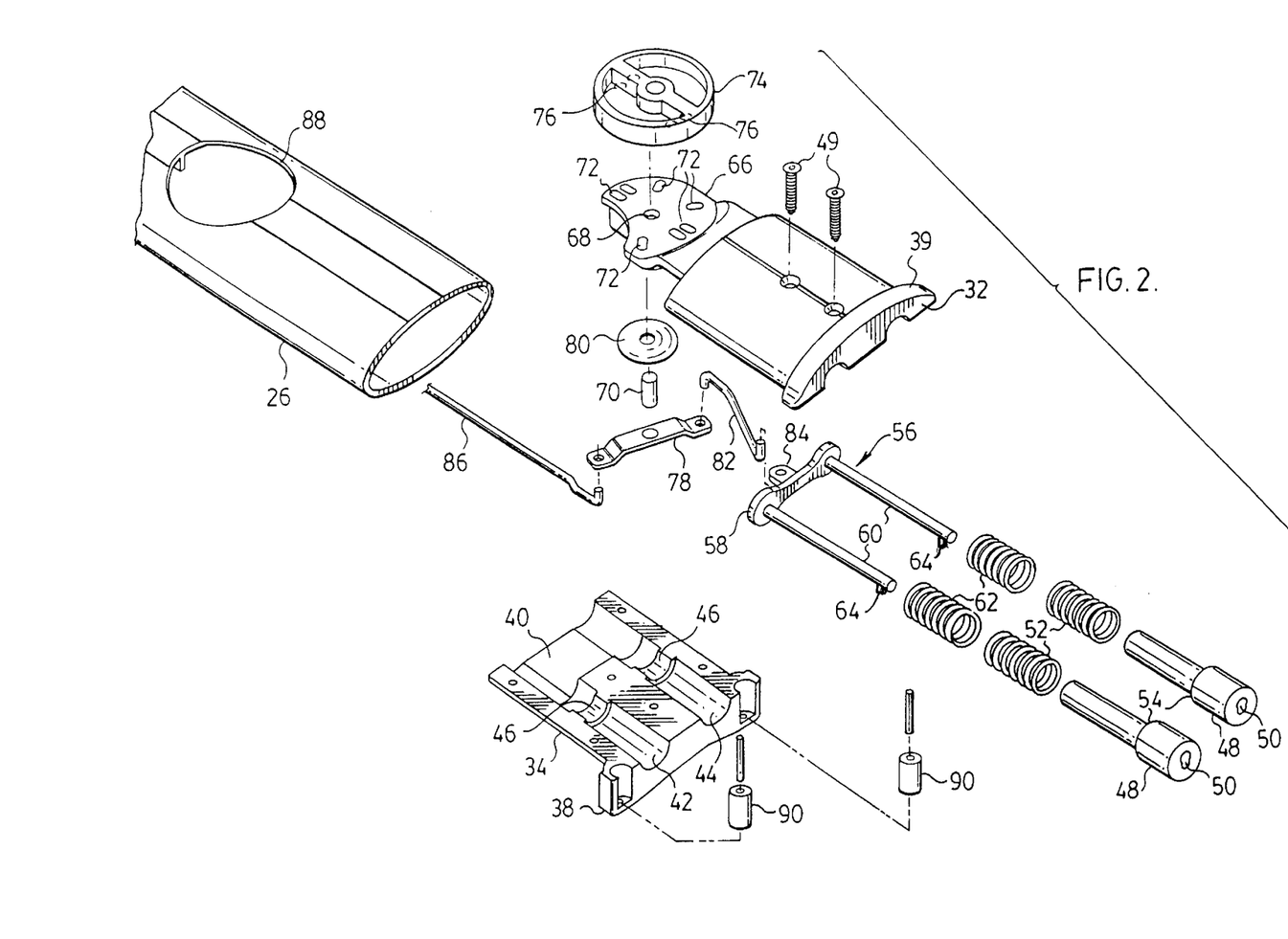
FIG. 2 is an exploded view of the active bracket of the embodiment of FIG. 1.

The cross rail assembly 24 comprises a hollow cross member 26, an active bracket 28 and a following bracket 30. Referring to FIG. 2, the active bracket 28 is illustrated. The active bracket 28 comprises a first upper half plug 32 and a first lower half plug 34. When the first upper half plug 32 and first lower half plug 34 are placed together, the combined first plug will close the first end of cross member 26. Each of the first half plugs 32 and 34 have a half flange 36 and 38 which will abut the end of the cross member 26. The combined first plug has an oval opening 40 which communicates with two parallel spaced apart bores 42 and 44. Each of the bores 42 and 44 has an inner step 46, the purpose of which will become apparent below.

Slidingly received within an outer portion of the bores 42 and 44 are supporting structure in the form of generally cylindrical members or collars 48. Each collar 48 has a cylindrical configuration with a stepped shaft complementary with the bores 42 and 44 and the inner step 46. Each collar 48 also has a slotted bore 50 which extends generally axially therethrough. The bore 50 has a "keyhole" configuration. A first pair of coil springs 52 is coaxially mounted about the collar 48 to act between step 46 and shoulders 54 of collar 48. Springs 52 act to bias the collars 48 outwardly away from their retracted positions and toward their extended positions.

Locking structure 56 comprises a plate 58 sized to be slidingly received in opening 40. Plate 58 has two spaced apart generally parallel locking pins 60 extending through slotted bores 50. Coil springs 62 are coaxially mounted on each of the pins 60 between plate 58 and an inner shoulder of step 46. Springs 62 act to bias locking pins 60 inwardly towards their unlocked positions. Each locking pin 60 has a radially extending key 64 which is configured to be received in the radial slot section of the axial bore 50 of an associated collar 48. Once the locking pins 60 have been inserted through collars 48, collars 48 are rotated to secure the assembly together. Suitable means to ensure the collars 48 from counter rotating are used. The pins 60 have a length greater than the length of the collars 48 and the collars 48 are able to slide relative to the pins 60 between their extended and retracted positions. Screws 49 secure the first upper half plug 32 to the first lower half plug 34 so as to define the first plug. Springs 52 and 62 are relatively light springs, primarily to bias the plate 58 away from the collars 48.

Together, the knob 74, the supporting structures or collars 48, the locking structures 56, and the functional and structural components associated therewith may be considered to define a locking assembly.

Upper half plug 32 has a plate 66 extending from an inward end. Plate 66 has a bore 68 for receiving pin 70. The upper surface of plate 66 has a series of detents 72 spaced circumferentially about the bore 68. Knob 74 is mounted on pin 70 so that its underside is in frictional engagement with the plate 66. The lower surface of knob 74 has a corresponding series of protrusions 76. The protrusions 76 and detents 72 cooperate to retain the knob 74 at selected, predetermined angular positions which correspond with a locked position, an adjusting position and a release position of the locking assembly.

On the opposite end of pin 70 and on the opposite side of plate 66, bellcrank 78 is mounted. Biasing disc 80 will urge the knob 74 into frictional engagement with the plate 66. One end of the bellcrank 78 is linked to a substantially rigid linking member 82 which connects the bellcrank 78 to plate 58. Tab 84 on plate 58 is provided for this purpose. Linking member 82 is suitably secured at each end thereof. The opposite end of bellcrank 78 is connected to rigid linking member 86 which extends the length of cross member 26 and connects to a corresponding locking structure 87 of the following bracket 30, the corresponding locking structure 87 being substantially identical to locking structure 56 and having corresponding supporting structure or collars associated therewith. The corresponding supporting members 89 are substantially identical to supporting members or collars 48.

Cross member 26 has a generally elliptical cross section for aerodynamic purposes. The end having the active bracket 28 has a circular aperture 88 spaced inwardly from the end. Aperture 88 is positioned to receive knob 74 and provide access thereto to allow the knob 74 to be turned in locking and unlocking directions.

Figure 3:
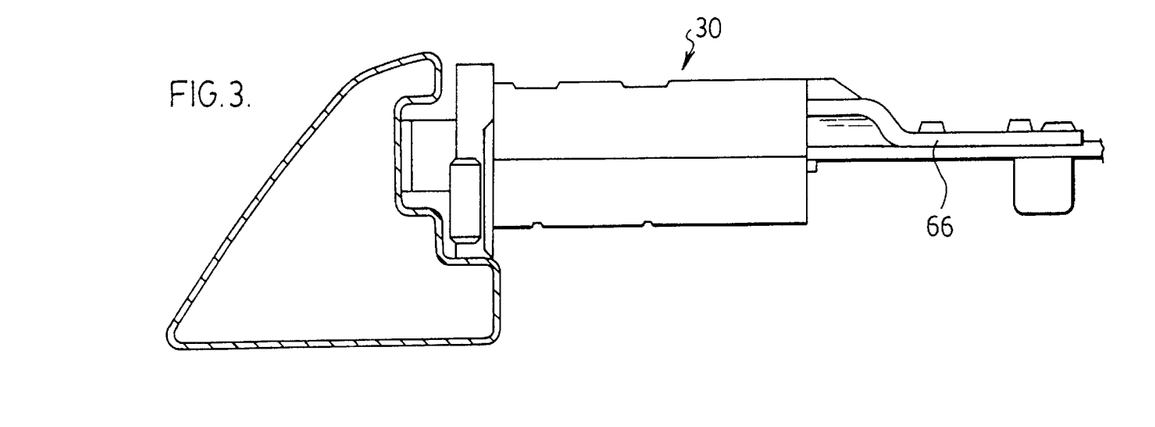
FIG. 3 is an elevational view of the following bracket of the embodiment of FIG. 1.
Figure 4:
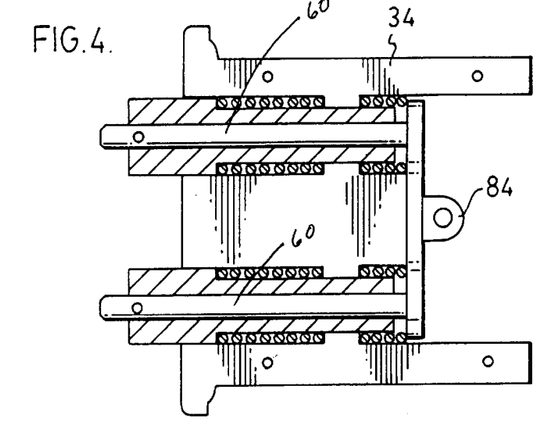
FIG. 4 is a partial top plan view of the following bracket of FIG. 3.

Referring to FIGS. 3 and 4, the following bracket 30 is illustrated. The following bracket 30 is identical to the active bracket 28 except that the pin 70, knob 74 and bellcrank 78 are omitted. The link 86 is connected directly to the tab 84 of the locking structure 87. Optionally, a separate upper half plug could be molded which omits the plate 66. The advantage of the preferred embodiment is that fewer parts have to be manufactured.

Optionally, the ends of the lower half bracket 34 can be provided with rollers 90 spaced outside of the bores 42 and 44. The rollers 90 will assist in preventing the cross rail assemblies 24 from binding during sliding and adjusting.

Figure 5:
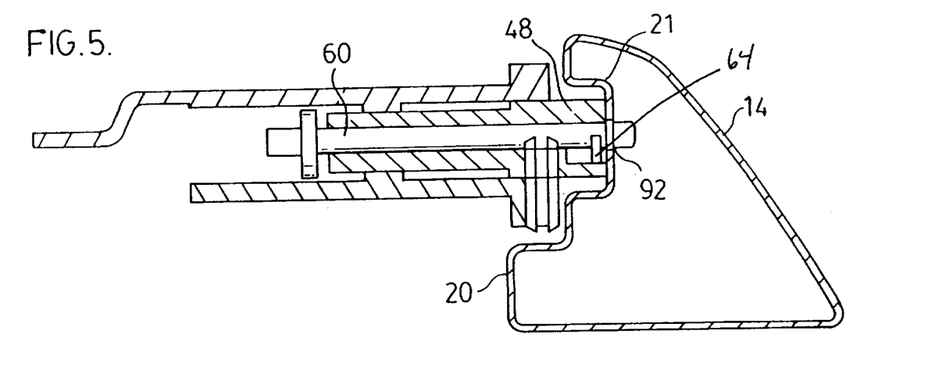
FIG. 5 is a side sectional view of the bracket of the embodiment of FIG. 1 in a locked position.
Figure 6:
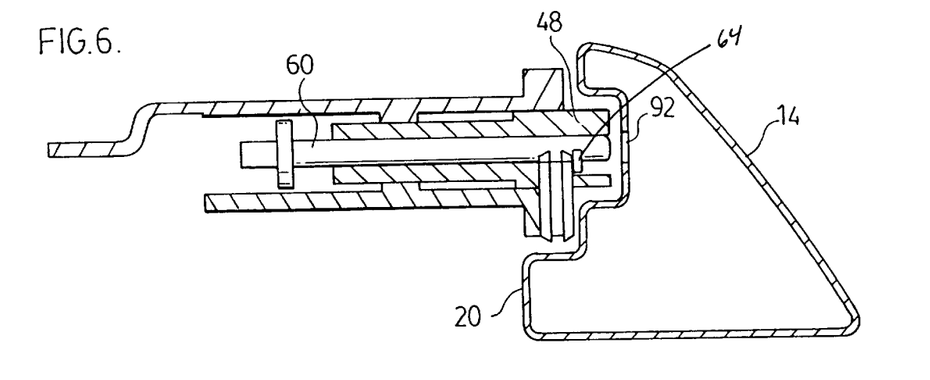
FIG. 6 is a side sectional view of the bracket of the embodiment of FIG. 1 in a sliding position.
Figure 7:
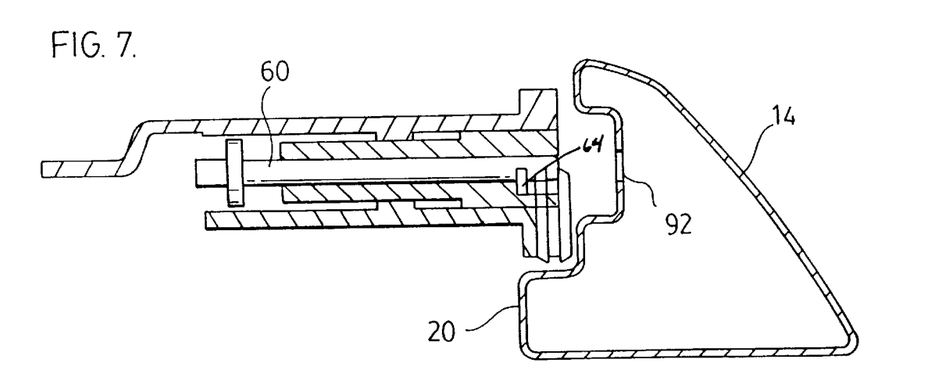
FIG. 7 is a side sectional view of the bracket of the embodiment of FIG. 1 in a release position.

Referring now to FIGS. 5–7, the operation of the present invention will be described. In a locked position, as illustrated in FIG. 5, knob 74 is rotated in a locking direction so that the bellcrank 78 is rotated to push the locking structures 56 and 87 outwardly into their locked positions wherein pins 60 extend outwardly into a pair of adjacent lock apertures 92 formed on an interior surface of channel or groove 21 to lock the cross rail assembly in one of a range of operating positions and prevent the cross rail assembly 24 from moving longitudinally with respect to the side rails 12, 14. A series of such lock apertures 92 are spaced along the length of the channel 21 and are configured to receive the pins 60. The bias of springs 52 will urge the collars 48 outwardly into their extended positions as well.

In an adjusting position, as illustrated in FIG. 6, the knob 74 is rotated which rotates the bellcrank 78 in an unlocking retracting sense. Linking members 82 and 86 will cause pins 60 to retract and slide inwardly relative to collars 48 into their unlocked positions. With the pins 60 will be withdrawn from the lock apertures 92 the cross rail assembly can be moved longitudinally along the side rails 12 and 14 through the range of operating positions with the collars 48 (i.e., the supporting structures) sliding along within the grooves 21 and supporting the assembly 24. Optionally, detents 72 and protrusions 76 can be positioned to retain the knob 74 in this condition freeing a hand of the operator for manipulating the cross rail assembly 24 through the range of operating positions. Once the cross rail assembly has been positioned, the knob 74 is counter-rotated to push the locking structures 56, 89 into the locked positions thereof with the pairs of pins 60 inserted into adjacent locking apertures 92.

In a release position, as illustrated in FIG. 7, the knob 74 is rotated further in the unlocking direction beyond the adjusting position. The keys 64 on the locking pins 60 will engage the axially facing surfaces of the collars 48 to withdraw both the pins 60 and collars 48 from the grooves or channels 21 of the side rails 12, 14 so that the cross rail assembly can be removed from the side rails 12 and 14. In this condition, the collars or supporting structures 48 may be considered to be in retracted positions. To install the cross rail assembly 24, the above steps are reversed.

Figure 8:
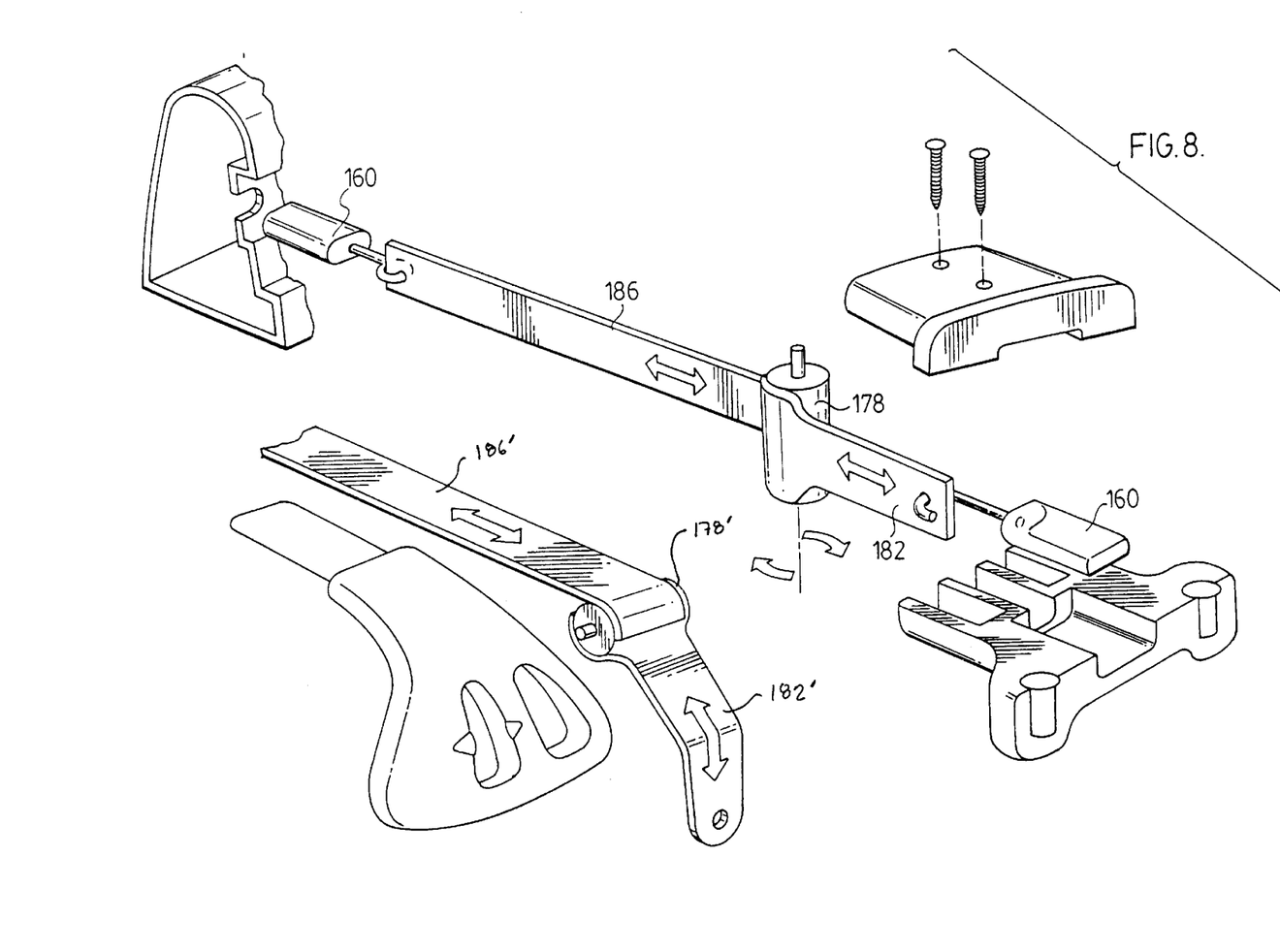
FIG. 8 is an exploded perspective view of a second embodiment of the present invention.

In a second embodiment as illustrated FIG. 8, the bellcrank and linkage have been replaced by a drum 178 connected to a flexible end of a substantially flat linking member 186 and a flexible end of substantially flat linking member 182. The drum 178 is oriented with its axis generally vertical. Further, the locking assembly comprises locking structures in the form of pins 160 connected to the flexible linking members 182 and 186. Rotation of the drum 178 will extend and retract the pins 160 in a manner similar to that described above. The linking members 182, 186 are made of a material with sufficient flexibility to wind over the drum 178 as it is turned and sufficient rigidity to push the pins 160 outwardly towards their locked positions. The linking members 182, 186 may be made of plastic or metal and may have a consistent or varying thickness. A varying thickness can be used to provide more flexibility at the drum end of the members 182, 186 and more rigidity at the pin end of the members 182, 186 by decreasing the thickness towards the drum end.

FIG. 8 also shows a variation of the second embodiment in the lower left corner thereof. This variation is designed for an arrangement wherein the locking members or pins (not shown) move generally vertically between the locked and unlocked positions thereof, rather than generally horizontally towards and away from one another. In this variation, the axis of the drum 178' is oriented generally horizontally with respect to the vehicle. The linking members 182' and 186' are bent over structures provided by the bracket plugs (not shown) so that their ends opposite the drum 178' are oriented generally vertically.

Figure 9:
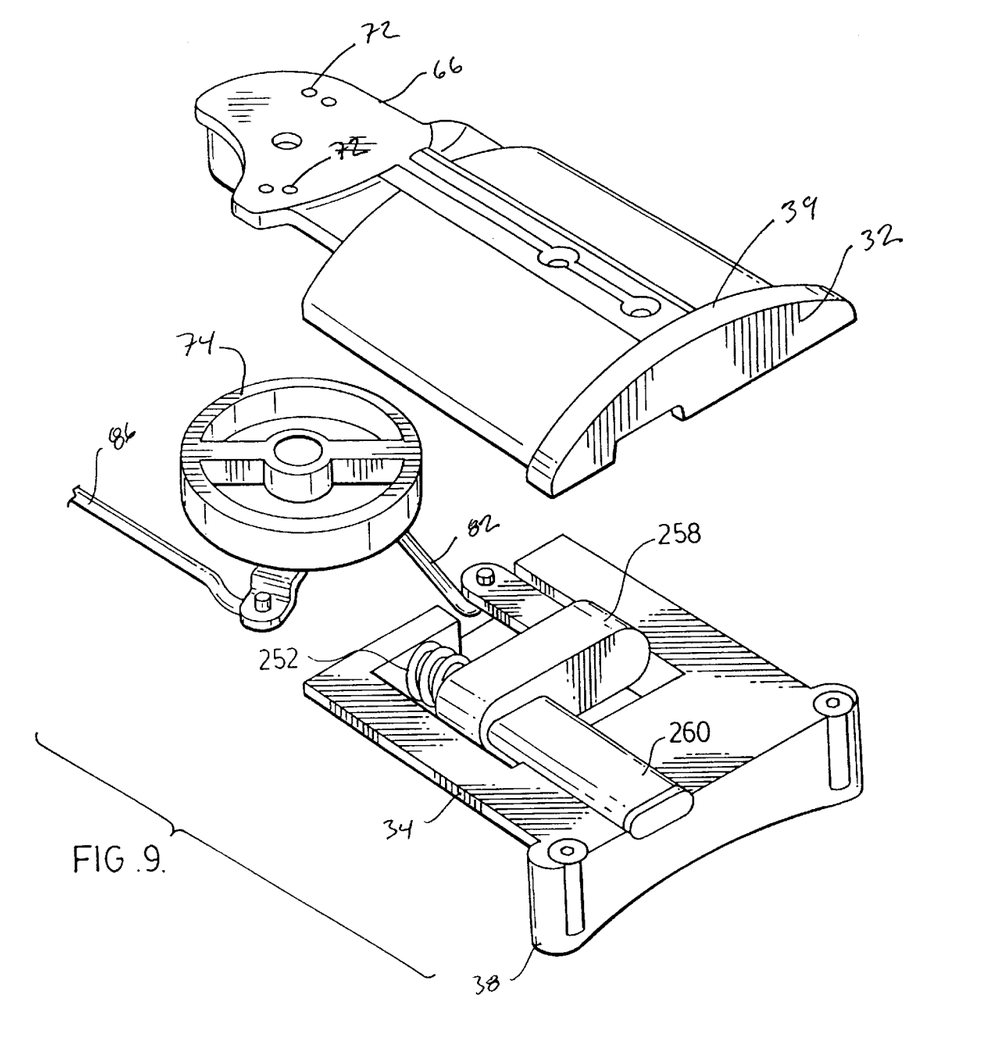
FIG. 9 is an exploded view of another embodiment of an end bracket of the present invention.

In a third embodiment as illustrated in FIG. 9, each locking structure is defined by a single pin 260. Pin 260 has a non-circular cross section to minimize twisting of the cross rail assembly 24 when in its locked position. A spring 252 acts on the plate 258 to provide a positive locking bias on the locking assembly. The positive locking bias will urge the pin 260 into engagement with the locking aperture of the side rail.

The preceding specific embodiments are illustrative of the practice of the present invention. It is to be understood, however, that other expedients known or apparent to those skilled in the art or disclosed herein may be employed without departing from the spirit of the invention.

What is claimed:

1. An article carrier assembly for installation on a generally upwardly facing exterior surface of a motor vehicle, said article carrier assembly comprising:
   a pair of elongated side rails constructed and arranged to be mounted on the exterior surface of the motor vehicle in spaced apart and generally parallel relation to one another;

an elongated cross rail assembly constructed and arranged to be mounted transversely with respect to said side rails in an operative position;

each of side rails having a longitudinally extending recessed groove positioned and configured such that said grooves face generally inwardly towards one another when said side rails are mounted on the motor vehicle exterior surface;

said cross rail assembly having a locking assembly comprising a pair of locking structures and a pair of rail supporting structures, each of said locking structures and said supporting structures being disposed at opposing end portions of said cross rail assembly;

said locking structures being movable between (1) unlocked positions wherein said locking structures are disengaged from said side rails to allow said cross rail assembly to be moved longitudinally along said side rails through a range of operating positions and (2) locked positions wherein said locking structures are engaged with said side rails to releasably lock said cross rail assembly in a selected one of said range of operating positions;

said supporting structures being movable between (1) extended positions wherein said supporting structures extend into said grooves to prevent said cross rail assembly from being moved generally upwardly out of said operating position thereof and (2) retracted positions wherein said supporting structures are withdrawn from said grooves to allow general upward movement of said cross rail assembly out of said operative position thereof and removal from said side rails;

said locking assembly further comprising (a) a manually actuable knob accessible from one side of the vehicle when said cross rail assembly is mounted transversely with respect to said side rails, and (b) a pair of linking members each operatively connecting said knob with an associated one of said locking structures;

said knob being turnable in (1) a locking direction to cause linking members to push said locking structures into said locked positions thereof and (2) in an unlocking direction to cause said locking structures to be moved to said unlocked positions thereof, thereby allowing longitudinal movement of said cross rail assembly along said side rails through said range of operating positions;

said locking assembly being movable by turning said knob in said locking and unlocking directions thereof between (1) a locked position wherein said locking structures are in said locked positions thereof and said supporting structures are in the extended positions thereof, (2) an adjusting position wherein said locking structures are in said unlocked positions thereof and said supporting structures are in said extended positions thereof, and (3) a release position wherein said locking structures are in said unlocked positions thereof and said supporting structures are in said retracted positions thereof, thereby allowing general upward movement of said cross rail assembly out of the operative position thereof and removal of said cross rail assembly from the side rails.

2. An article carrier assembly according to claim 1, wherein said locking assembly further comprises a bell crank member connected to said knob, said linking members being connected to opposing end portions of said bell crank member.

3. An article carrier assembly according to claim 1, wherein said locking assembly further comprises a pair of springs, each of said springs being associated with one of said locking structures, and being positioned and configured to bias said locking structure towards said unlocked positions thereof.

4. An article carrier assembly according to claim 3, wherein each of said locking structures comprises a pair of generally parallel locking pins interconnected for movement together and wherein said side rails each have a plurality of spaced apart apertures, said locking structures being configured such that the locking pins of each interconnected pair are inserted into a pair of adjacent apertures on an associated one of said side rails when said locking structures are in said locked positions thereof to thereby releasably lock said cross rail assembly in said one of said range of operating positions.

5. An article carrier assembly according to claim 1, wherein said cross rail assembly comprises a central hollow cross member and wherein said locking assembly comprises first and second upper plug halves and first and second lower plug halves;

said first upper plug half and said first lower plug half being engaged with each other to define a first plug, one of said locking structures being movably mounted to said first plug and said first plug being mounted to a first opposing end of said hollow cross member such that said one of said locking structures extends outwardly with respect to said cross member and said first plug closes off the first opposing end of said cross member;

said second upper plug and said second lower plug being engaged with one another to define a second plug, the other of said locking structures being movably mounted to said second plug and said second plug being mounted to a second opposing end of said hollow cross member opposite said first opposing end such that the other of said locking structures extends outwardly with respect to said cross member and said second plug closes off the second opposing end of said cross member.

6. An article carrier assembly according to claim 5, wherein said cross member has an opening formed through the wall thereof adjacent to said first opposing end thereof and wherein said knob is mounted to the first upper plug half of said first plug such that said knob extends through the opening in said cross member.

7. An article carrier assembly according to claim 6, wherein said knob has an underside with at least one protrusion formed thereon and wherein the first upper plug half has a series of indentations, said at least one protrusion and said indentations cooperating to releasably retain said knob in a locked position corresponding to the locked positions of said locking structures and an unlocked position corresponding to the unlocked positions of said locking structures.

8. An article carrier assembly according to claim 1, wherein said cross member has an opening formed through the wall thereof adjacent to said first opposing end thereof and wherein said knob is mounted to the first upper plug half of said first plug such that said knob extends through the opening in said cross member.

9. An article carrier assembly according to claim 8, wherein said knob has an underside with at least one protrusion formed thereon and wherein the first upper plug half has a series of indentations, said at least one protrusion and said indentations cooperating to releasably retain said knob in the lock position, the adjusting position, and the release position.

10. An article carrier assembly according to claim 1, wherein said locking assembly further comprises a pair of linking members each operatively connecting said knob with an associated one of said locking structures;

said knob being turnable into the locking position thereof to cause said linking members to push said locking structures into said locked positions thereof and into the adjusting position thereof to move said locking structures to said unlocked positions thereof.

11. An article carrier assembly according to claim 10, wherein said locking assembly further comprises a bell crank member connected to said knob, said linking members being connected to opposing end portions of said bell crank member.

12. An article carrier assembly according to claim 10, wherein said locking assembly further comprises a pair of springs, each of said springs being associated with one of said locking structures and being positioned and configured to bias said locking structures towards said unlocked positions thereof.

13. An article carrier assembly according to claim 12, wherein each of said locking structures comprises a pair of generally parallel locking pins interconnected for movement together and wherein said side rails each have a plurality of spaced apart apertures extending along an interior surface of an associated groove, said locking structures being configured such that the locking pins of each interconnected pair are inserted into a pair of adjacent apertures on the interior surface of the associated one of said side rails when said locking structures are in said locked positions thereof to thereby releasably lock said cross rail assembly in said one of said range of operating positions.

14. An article carrier assembly according to claim 1, wherein each of said locking structures is a pair of generally parallel locking pins interconnected for movement together and wherein each of said side rails has a plurality of spaced apart apertures extending along an interior surface of an associated groove, said locking structures being configured such that the locking pins of each interconnected pair are inserted into a pair of adjacent apertures on the interior surface of the groove of an associated one of said side rails when said locking structures are in said locked positions thereof;

each of said supporting structures comprising a pair of generally cylindrical members each having a generally axial bore formed therethrough, each of said cylindrical members being slidably mounted on an associated locking pin with the locking pins received within the bores of said cylindrical members.

15. An article carrier assembly according to claim 14, wherein said locking assembly further comprises locking structure biasing springs and supporting structure biasing springs, each of said locking structure biasing springs being constructed and arranged to bias said locking structure towards the unlocked positions thereof, each of said supporting structure biasing springs being constructed and arranged to bias said supporting members towards the extended positions thereof.

16. An article carrier assembly according to claim 14, wherein each of said locking pins has a generally radially extending key member on an outer end portion thereof, said key members being constructed and arranged to engage respective cylindrical members and thereafter move said cylindrical members inwardly from the extended positions thereof to the retracted positions thereof as a result of said locking pins being moved further inwardly beyond the unlocked positions thereof when said knob is turned from the adjusting position thereof to the release position thereof.

17. An article carrier assembly for installation on a generally upwardly facing exterior surface of a motor vehicle, said article carrier assembly comprising:

a pair of elongated side rails constructed and arranged to be mounted on the exterior surface of the motor vehicle in spaced apart and generally parallel relation to one another;

an elongated cross rail assembly constructed and arranged to be mounted transversely with respect to said side rails in an operating position;

each of said side rails having a longitudinally extending recessed groove positioned and configured such that said grooves face generally inwardly towards one another when said side rails are mounted on the motor vehicle exterior surface;

said cross rail assembly having a locking assembly comprising a pair of locking structures and a pair of rail supporting structures, each of said locking structures and said supporting structures being disposed at opposing end portions of said cross rail assembly;

said locking structures being movable between (1) unlocked positions wherein said locking structures are disengaged from said side rails to allow said cross rail assembly to be moved longitudinally along said side rails through a range of operating positions and (2) locked positions wherein said locking members are engaged with said side rails to releasably lock said cross rail assembly in a selected one of said range of operating positions;

said supporting structures being movable between (1) extended positions wherein said supporting structures extend into said grooves to prevent said cross rail assembly from being moved generally upwardly out of said operating position thereof and (2) retracted positions wherein said supporting structures are withdrawn from said grooves to allow general upward movement of said cross rail assembly out of said operative position thereof and removal from said side rails;

said cross rail assembly further comprising a manually operable actuator accessible from one side of the vehicle when said cross rail assembly is mounted transversely with respect to said side rails in said operating position thereof;

said actuator being movable between (1) a locked position wherein said locking structures are in said locked positions thereof and said supporting structures are in the extended positions thereof, (2) an adjusting position wherein said locking structures to are in said unlocked positions thereof and said supporting structures are in said extended positions thereof, and (3) a release position wherein said locking structures are in said unlocked positions thereof and said supporting structures are in said retracted positions thereof, thereby allowing general upward movement of said cross rail assembly out of the operative position thereof and removal of said cross rail assembly from the side rails.

18. An article carrier assembly according to claim 17, wherein said manually operable actuator is a manually turnable knob.

19. An article carrier assembly according to claim 18, wherein said cross rail assembly comprises a central hollow cross member and wherein said locking assembly comprises first and second upper plug halves and first and second lower plug halves;

said first upper plug half and said first lower plug half being engaged with one another to define a first plug, one of said locking structures being movably mounted to said first plug and said first plug being mounted to a first opposing end of said hollow cross member such that said one of said locking structures extends outwardly with respect to said cross member and said first plug closes off the first opposing end of said cross member;

said second upper plug half and said second lower plug half being engaged with one another to define a second plug, the other of said locking structures being movably mounted to said second plug and said second plug being mounted to a second opposing end of said hollow cross member opposite the first opposing end such that the other of said locking structures extends outwardly with respect to said cross member and said second plug closes off the second opposing end of said cross member.

20. An article carrier assembly according to claim 19, wherein said cross member has an opening formed through the wall thereof adjacent to said first opposing end thereof and wherein said knob is mounted to the first upper plug half of said first plug such that said knob extends through the opening in said cross member.

21. An article carrier assembly according to claim 20, wherein said knob has an underside with at least one protrusion formed thereon and wherein the first upper plug half has a series of indentations, said at least one protrusion and said indentations cooperating to releasably retain said knob in the locked position, the adjusting position, and the release position.

22. An article carrier assembly according to claim 18, wherein said locking assembly further comprises a pair of linking members each operatively connecting said knob with an associated one of said locking structures;

said knob being turnable into the locked position thereof to cause said linking members to push said locking structures into said locked positions thereof and into the adjusting position thereof to move said locking structures to said unlocked positions thereof.

23. An article carrier assembly according to claim 22, wherein said locking assembly further comprises a bell crank member connected to said knob, said linking members being connected to opposing end portions of said bell crank member.

24. An article carrier assembly according to claim 22, wherein said locking assembly further comprises a pair of springs, each of said springs being associated with one of said locking structures and being positioned and configured to bias said locking structures towards said unlocked positions thereof.

25. An article carrier assembly according to claim 24, wherein each of said locking structures comprises a pair of generally parallel locking pins interconnected for movement together and wherein said side rails each have a plurality of spaced apart apertures extending along an interior surface of an associated groove, said locking structures being configured such that the locking pins of each interconnected pair are inserted into a pair of adjacent apertures on the interior surface of the associated one of said side rails when said locking structures are in said locked positions thereof to thereby releasably lock said cross rail assembly in said one of said range of operating positions.

26. An article carrier assembly according to claim 17, wherein each of said locking structures is a pair of generally parallel locking pins interconnected for movement together and wherein each of said side rails has a plurality of spaced apart apertures extending along an interior surface of an associated groove, said locking structures being configured such that the locking pins of each interconnected pair are inserted into a pair of adjacent apertures on the interior surface of the groove of an associated one of said side rails when said locking structures are in said locked positions thereof;

each of said supporting members comprising a pair of generally cylindrical members each having a generally axial bore formed therethrough, each of said cylindrical members being slidably mounted on an associated locking pin with the locking pins received within the bores of said cylindrical members.

27. An article carrier assembly according to claim 26, wherein said locking assembly further comprises locking structure biasing springs and supporting structure biasing springs, each of said locking structure biasing springs being constructed and arranged to bias said locking structure towards the unlocked positions thereof, each of said supporting structure biasing springs being constructed and arranged to bias said supporting members towards the extended positions thereof.

28. An article carrier assembly according to claim 26, wherein each of said locking pins has a generally radially extending key member on an outer end portion thereof, said key members being constructed and arranged to engage respective cylindrical members and thereafter move said cylindrical members inwardly from the extended positions thereof to the retracted positions thereof as a result of said locking pins being moved further inwardly beyond the unlocked positions thereof when said actuator is moved from the adjusting position thereof to the release position thereof.

* * * * *